(12) United States Patent
Wakamizu et al.

(10) Patent No.: US 7,653,296 B2
(45) Date of Patent: Jan. 26, 2010

(54) CAMERA AND EXCHANGEABLE LENS BARREL WITH WIRELESS COMMUNICATION FUNCTION

(75) Inventors: Yoh Wakamizu, Yokohama (JP); Shigemasa Sato, Yokohama (JP); Hidefumi Ota, Kawasaki (JP)

(73) Assignee: Nikon Corporation, Tokyo (JP)

( * ) Notice: Subject to any disclaimer, the term of this patent is extended or adjusted under 35 U.S.C. 154(b) by 252 days.

(21) Appl. No.: 11/512,255

(22) Filed: Aug. 30, 2006

(65) Prior Publication Data

US 2007/0098384 A1 May 3, 2007

(30) Foreign Application Priority Data

Aug. 30, 2005  (JP) .............................. 2005-249488

(51) Int. Cl.
 *G03B 17/00* (2006.01)
(52) U.S. Cl. ......................................................... 396/56
(58) Field of Classification Search ................... 396/56; 343/702; 348/14.02, 211.1–211.2
See application file for complete search history.

(56) References Cited

U.S. PATENT DOCUMENTS

| 4,352,543 | A | * | 10/1982 | Furusawa et al. | ............ 359/830 |
| 6,026,245 | A | * | 2/2000 | Fujii et al. | .................... 396/85 |
| 6,052,509 | A | * | 4/2000 | Abe | ........................... 386/117 |
| 6,677,904 | B2 | * | 1/2004 | Lichtfuss | .................... 343/702 |
| 6,816,121 | B1 | * | 11/2004 | Cheng et al. | ................. 343/702 |
| 2002/0041765 | A1 | * | 4/2002 | Onda et al. | ................. 396/538 |
| 2006/0093340 | A1 | * | 5/2006 | Yamaki | ....................... 396/56 |

FOREIGN PATENT DOCUMENTS

JP     2001-157099     6/2001

* cited by examiner

*Primary Examiner*—W. B. Perkey
*Assistant Examiner*—Minh Q Phan

(57) ABSTRACT

A camera capable of conducting a wireless communication includes a wireless communication circuit and a wireless communication antenna. The wireless communication antenna, which is disposed at a non-metal movable member that can advance and retreat relative to a camera body, moves relative to the camera body.

4 Claims, 5 Drawing Sheets

CAMERA AND EXCHANGEABLE LENS BARREL WITH WIRELESS COMMUNICATION FUNCTION

INCORPORATION BY REFERENCE

The disclosure of the following priority application is herein incorporated by reference:
Japanese Patent Application No. 2005-249488 filed Aug. 30, 2005

BACKGROUND OF THE INVENTION

1. Field of the Invention

The present invention relates to a camera and exchangeable lens barrel with a wireless communication function.

2. Description of Related Art

Japanese Laid Open Patent Publication No. 2001-157099 discloses an electronic camera with a wireless communication function. The antenna used in communication in this camera is disposed at a position where it is not likely to be touched by the user, e.g., at an exposed portion at a side of the lens barrel, so as to prevent a communication performance from deteriorating by contact with the user's hand.

If a metal component is present near the antenna, the radio signal with which information is wirelessly communicated is blocked by the metal, leading to poor communication performance. However, it is more desirable to encase the camera with a metal cover to ensure better rigidity and a higher-end look for the camera. Accordingly, the antenna needs to be disposed with care at a position where the radio signals are not blocked by the metal cover.

SUMMARY OF THE INVENTION

A camera capable of conducting a wireless communication according to the first aspect of the invention comprises a wireless communication circuit and a wireless communication antenna. The wireless communication antenna, which is disposed at a non-metal movable member that can advance and retreat relative to a camera body, moves relative to the camera body. It is desirable that the movable member rotates around an axis extending in a direction along which the movable member advances and retreats relative to the camera body, and the antenna is disposed at a position decentered from the rotational axis of the movable member.

The camera according to the first aspect may further comprise a control device that drives the movable member and brings the antenna to a position at which an optimal communication condition is achieved when executing wireless communication. It is desirable that the control device executes control to bring the antenna to the position at which the optimal communication condition is achieved while wireless communication is in progress as well.

It is desirable that the movable member is a photographic lens barrel and the photographic lens barrel advances/retreats along an optical axis of the photographic lens barrel in response to an operation signal provided from a zoom switch. The photographic lens barrel may move along an optical axis of the photographic lens barrel between a retracted position and a photographing-enabled position.

It is desirable that the camera according to the first aspect further comprises a metal cover that covers the camera body and the movable member is constituted of resin.

An exchangeable lens barrel according to the second aspect comprises a wireless communication circuit and a wireless communication antenna. It is desirable that the exchangeable lens barrel according to the second aspect further comprises an electrical contact point that enables data exchange between the wireless. communication circuit and a control unit in a camera. The wireless communication antenna may be disposed at resin portion that forms at least a part of the exchangeable lens barrel.

DETAILED DESCRIPTION OF THE PREFERRED EMBODIMENTS

First Embodiment

The first embodiment of the present invention is now explained in reference to drawings.

Figure 1:
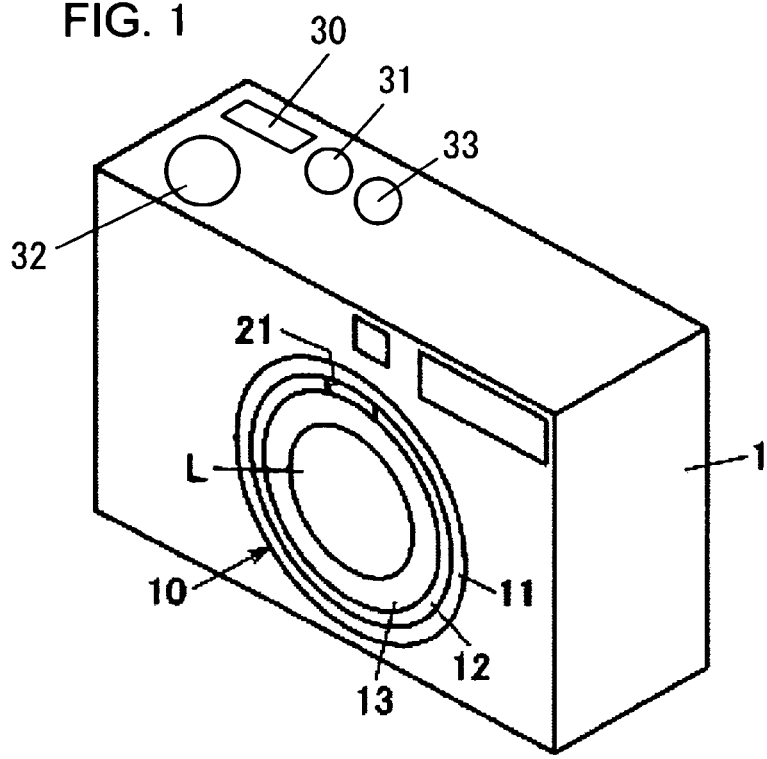
FIG. 1 is a perspective of the electronic camera in a first embodiment with the lens barrel in a retracted state.
Figure 2:
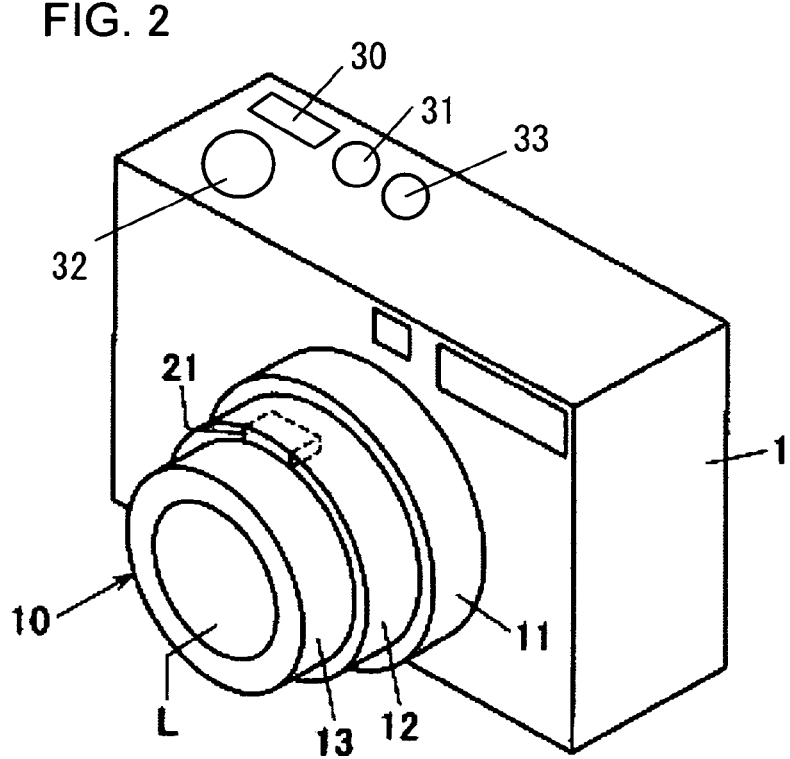
FIG. 2 is a perspective similar to FIG. 1, showing the lens barrel at the maximum extended state.
Figure 3:
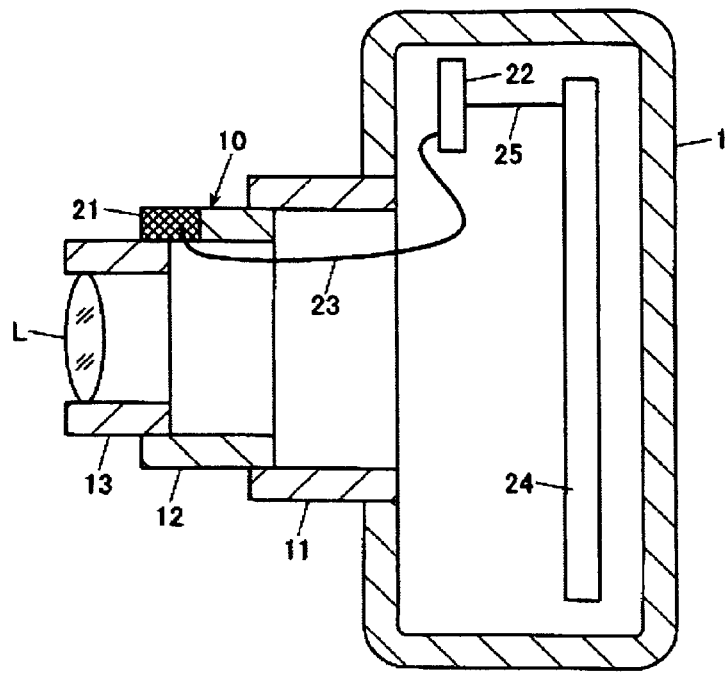
FIG. 3 is a sectional view of the camera in the State shown in FIG. 2.

FIGS. 1 through 3 schematically illustrate the electronic camera achieved in the first embodiment. Reference numeral 1 indicates a metal exterior cover (hereafter referred to as a metal cover) constituting the outer casing for the camera body and reference numeral 10 indicates a photographic lens barrel. The lens barrel 10 is constituted by telescopically assembling first through third tubular bodies 11, 12 and 13 all constituted of resin, with a photographic lens L held at the third tubular body 13. FIG. 1 shows the electronic camera in a retracted state, i.e., a state in which the lens barrel 10 has been driven entirely back into the camera body, whereas FIG. 2 shows the electronic camera in the completely extended state. FIG. 3 is a longitudinal sectional view of FIG. 2. The camera in the first embodiment is a compact camera that includes the lens barrel 10 built into the camera body as an integrated part thereof.

Figure 4:
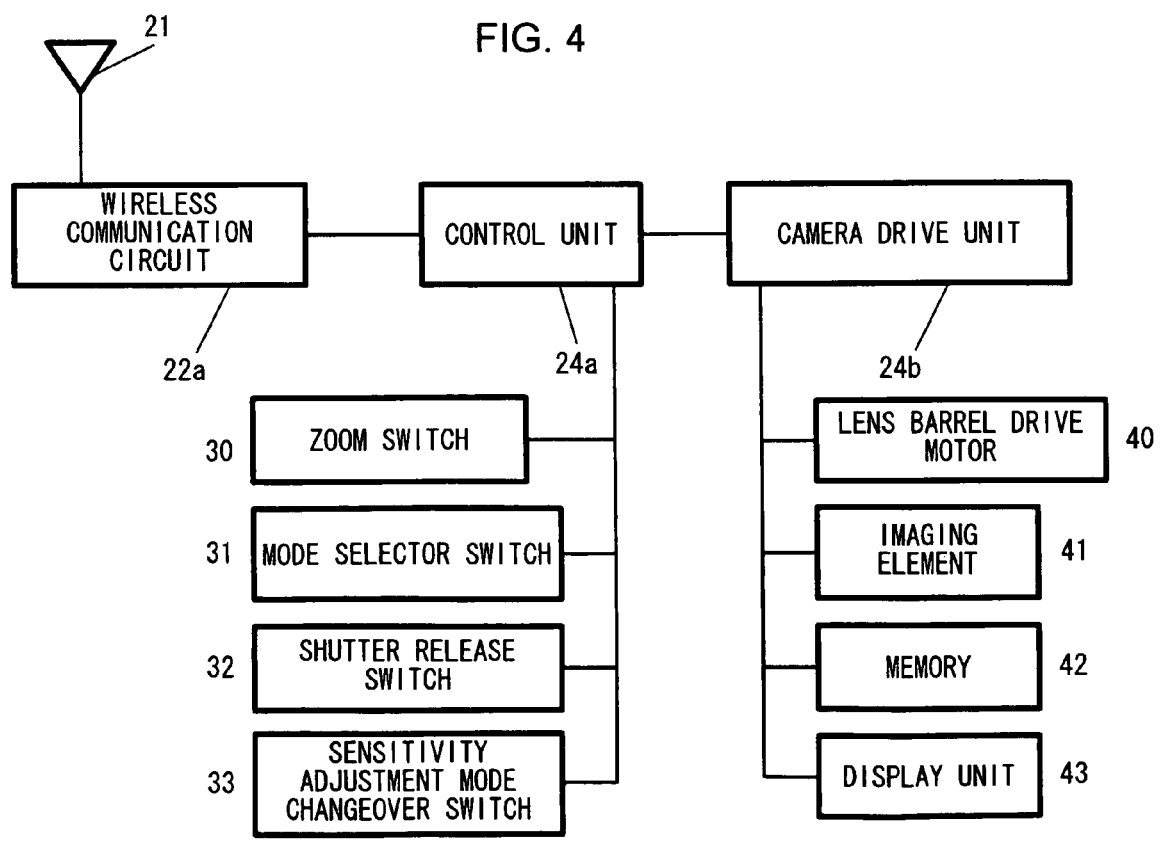
FIG. 4 is a block diagram of the control system in the camera.

FIG. 4 is a block diagram of the control system of the electronic camera achieved in the first embodiment. A control unit 24a, which may be constituted with, for instance, a microcomputer and the like, controls operations of the electronic camera. A wireless communication circuit 22a, a camera drive unit 24b and the like to be described later are connected to the control unit 24a, and signals from a zoom switch 30, a mode selector switch 31, a shutter release switch 32, a sensitivity adjustment mode changeover switch 33 and the like are input to the control unit 24a. The control unit 24a controls the camera drive unit 24b and the wireless communication circuit 22a in response to the signals provided from the zoom switch 30, the mode selector switch 31, the shutter release switch 32, the sensitivity adjustment mode changeover switch 33 and the like.

The zoom switch 30 is an operating member operated by the user to issue a zooming operation instruction for the lens barrel 10. The lens barrel 10 extends and contracts between a photographing-allowed position (wide end) and a most extended state (telephoto end) in response to the signal provided from the zoom switch 30. The mode selector switch 31 is an operating member operated by the user to select an operating mode for the electronic camera. The operating modes that may be selected in the electronic camera include a photographing mode for executing a photographing operation with the electronic camera, a reproduction mode for displaying image data and the like at a display unit 43 and a wireless communication mode for wirelessly communicating with an external device. The shutter release switch 32 is an operating member operated by the user to issue a shutter release operation start instruction for the electronic camera. The sensitivity adjustment mode changeover switch 33 is an operating member operated by the user to switch the sensitivity adjustment mode in an antenna 21 as explained later. It is to be noted that the sensitivity adjustment mode may be switched via a menu screen displayed at the display unit 43 and in such a case, the sensitivity adjustment mode changeover switch 33 is not required.

The lens barrel 10 is driven by using a lens barrel drive motor 40, which is controlled by the camera drive unit 24b as a drive source. The first tubular body 11 advances/retreats relative to the camera body, whereas the second tubular body advances/retreats as it rotates around the optical axis of the photographic lens L relative to the first tubular body 11. The third tubular body 13 advances/retreats without rotating relative to the second tubular body 12 due to the presence of a cam formed at the second tubular body 12. Namely, the lens barrel 10 extends and retracts as the entire assembly thereof moves along the optical axis of the photographic lens L. When the power to the camera is in an OFF state, the lens barrel 10 is in the retracted state as shown in FIG. 1 and, as the power is turned on, it is driven out to a predetermined position (photographing-allowed position) to enable a photographing operation. Subsequently, it is allowed to move as far as the position shown in FIG. 2 for zooming in response to the signal provided from the zoom switch 31.

At the front end of the second tubular body 12, which is a rotating tube, an antenna 21 for wireless communication is disposed. The antenna 21 may be partially exposed to the outside or it may be completely shielded. A wireless communication board 22 at which the wireless communication circuit 22a (see FIG. 4) is mounted is disposed inside the camera body and the wireless communication circuit 22a is electrically connected with the antenna 21 via a flexible printed board 23. The wireless communication board 22 is electrically connected with a main board 24 at the camera body via a wiring member 25.

Various electrical components constituting the control unit 24a, the camera drive unit 24b and the like are mounted at the main board 24. While a detailed explanation is not provided, the camera drive unit 24b is constituted with various circuits (e.g., an imaging circuit, a recording circuit, a lens barrel drive circuit, a display control circuit and the like) so as to enable overall operations of the electronic camera. The camera drive unit 24b is connected with the lens barrel drive motor 40, an image-capturing element (e.g., a CCD sensor or a CMOS sensor) 41, a memory 42, the display unit and the like.

Next, the wireless communication executed in the camera is explained.

Once the user selects the wireless communication mode in the camera by operating the mode selector switch 31, image data and other types of information can be wirelessly transmitted to an external device (not shown) from the electronic camera. For instance, as a transmit instruction is issued by indicating specific image data to be transmitted among sets of image data having been recorded are indicated, the control unit 24a transmits the specified image data to the wireless communication circuit 22a, where the data are converted to a radio signal and the wireless communication circuit 22a then transmits the radio signal via the antenna 21. In addition, data transmitted from an external source and received at the antenna 21 can be taken into the camera.

The presence of a metal component near the antenna 21 during wireless communication compromises the communication performance, since the radio signal is likely to be blocked by the metal. The antenna 21 is set in close proximity to the metal cover 11 in FIG. 1 and the antenna 21 thus needs to be set further out in order to assure good communication performance. Accordingly, the antenna 21 is disposed at the lens barrel 10, which is engaged in the zooming operation as it moves between the photographing-allowed position (wide end) and the most extended state (telephoto end) shown in FIG. 2 in the embodiment. Then, as the lens barrel 10 is driven out along the optical axis, the antenna 21 is made to move further away from the front surface of the metal cover 1 and wireless communication is executed in this condition.

Since the second tubular body 12 is constituted of resin, the second tubular body itself does not adversely affect the communication performance, and the communication performance is not compromised by the metal component once the antenna 21 is set over some distance away from the metal cover 1. In other words, it is not strictly necessary to drive out the lens barrel 10 (the second tubular body 12 in this situation) to the maximum extended position.

The second tubular body 12, in particular, which supports the antenna 21, advances/retreats along the optical axis as it rotates around the optical axis and thus, the antenna 21, decentered from the optical axis, is caused to revolve around the optical axis. As the antenna 21 thus revolves, i.e., as the antenna 21 changes its rotational position, the sensitivity is adjusted in correspondence to the directivity of the antenna 21. This means that at the position at which the best communication performance is achieved, the second tubular body 12 projects out at least over some distance from the metal cover 1 and the antenna 21 assumes the rotating position at which the optimal sensitivity is assured.

Either a manual sensitivity adjustment mode in which the antenna position is manually adjusted by the user, or an automatic sensitivity adjustment mode in which the antenna position is adjusted by the control unit 24a, can be selected for the antenna position adjustment. The sensitivity adjustment mode can be switched from the manual sensitivity adjustment mode to the automatic sensitivity adjustment mode and vice versa in response to a signal from the sensitivity adjustment mode changeover switch 33.

Figure 5:
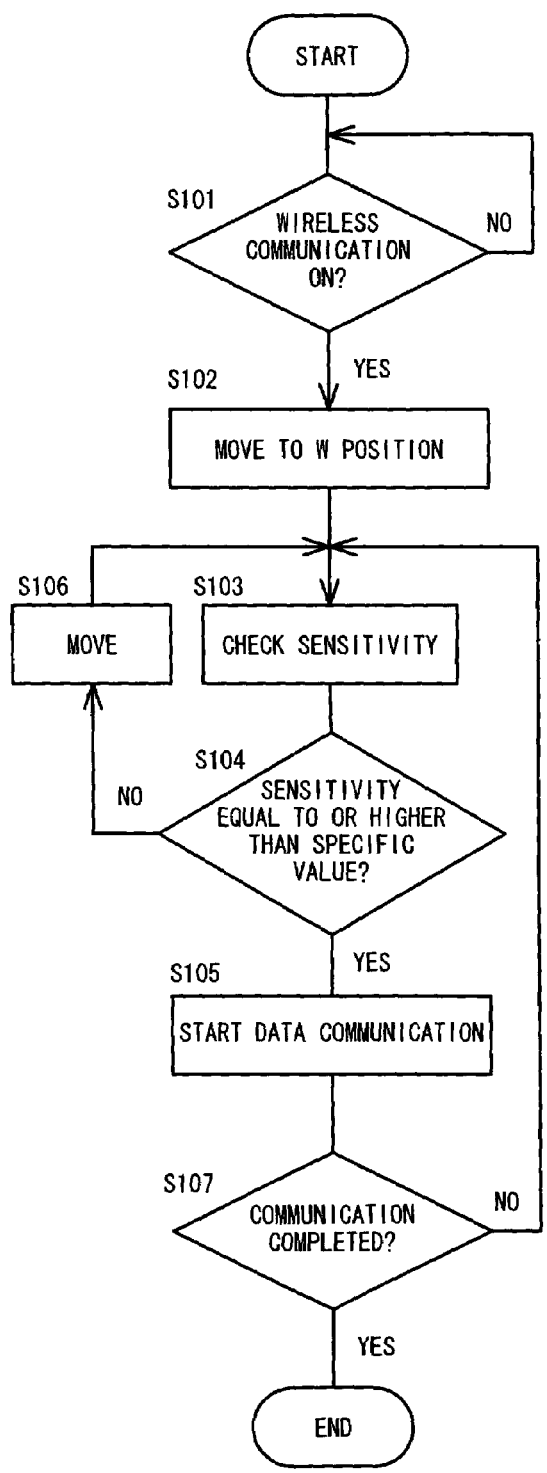
FIG. 5 presents a flowchart of the sensitivity adjustment processing procedure executed in the automatic sensitivity adjustment mode.

The sensitivity adjustment processing procedure executed in the automatic sensitivity adjustment mode is now explained in reference to FIG. 5. FIG. 5 presents a flowchart of the sensitivity adjustment processing procedure executed by the control unit 24a in the automatic sensitivity adjustment mode.

In step S101, a decision is made as to whether or not the wireless communication mode has been set based upon the signal from the mode selector switch 31. If it is decided that the camera is currently set in the wireless communication mode, the operation proceeds to step S102, whereas if the camera is not currently set in the wireless communication mode, the processing in step S101 is repeatedly executed. In step S102, the lens barrel drive motor 40 is driven to move the lens barrel 10 to the photographing-allowed position (wide end).

In step S103, the communication state is checked by detecting the reception sensitivity at the antenna 21. In step S104, a decision is made as to whether or not the reception sensitivity at the antenna 21 having been detected in step S103 is equal to or higher than a predetermined specific value. If the reception sensitivity level is equal to or higher than the specific value, the communication state is judged to be good and, in this case, the operation proceeds to step S105 to start wireless communication of image data or the like.

If, on the other hand, it is decided in step S104 that the reception sensitivity is lower than the specific value, the operation proceeds to step S106. In step S106, the lens barrel drive motor 40 is driven to move the lens barrel 10 by a predetermined extent along the optical axis of the photographic lens L. Then, the operation returns to step S103 to check the reception sensitivity at the antenna 21. The processing in steps S106 and S103 is repeatedly executed until it is decided in step S104 that the reception sensitivity is equal to or higher than the specific value.

In step S107, a decision is made as to whether or not the wireless communication of the image data or the like has been completed. If the wireless communication has not been completed, the operation returns to step S103 to continuously execute the sensitivity adjustment processing, whereas the entire processing ends upon judging that the wireless communication has been completed.

As described above, when the wireless communication mode is selected, the control unit 24a drives the lens barrel 10 while monitoring the communication state and allows wireless communication to be executed by stopping the drive of the lens barrel 10 at the position at which the best communication performance is achieved. In addition, the communication state may become poor as the environment surrounding the camera changes while communication is in progress. For this reason, the control unit 24a drives the lens barrel 10 based upon the communication state by constantly monitoring the communication state while the communication is in progress. As a result, the antenna 21 can be held at the position at which the best communication performance is assured at all times.

Figure 6:
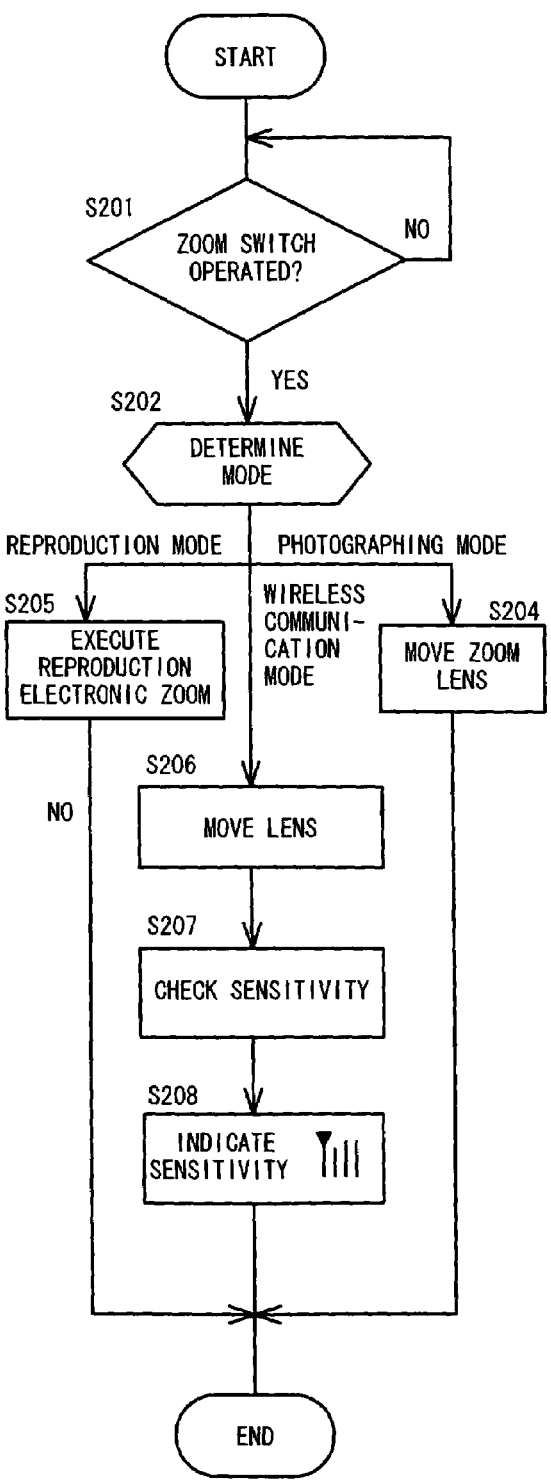
FIG. 6 presents a flowchart of the sensitivity adjustment processing procedure executed in the manual sensitivity adjustment mode.

Next, the sensitivity adjustment processing procedure executed in the manual sensitivity adjustment mode is explained in reference to FIG. 6. FIG. 6 presents a flowchart of the sensitivity adjustment processing procedure executed by the control unit 24a in the manual sensitivity adjustment mode.

In step S201, a decision is made as to whether or not the zoom switch 30 has been operated by the user. If the zoom switch 30 has been operated by the user, the operation proceeds to step S202, whereas if the zoom switch 30 has not been operated, the processing in step S201 is repeatedly executed. In step S202, the signal provided from the mode selector switch 31 is read and the operating mode of the electronic camera is determined.

If the electronic camera is currently set in the photographing mode, the operation proceeds to step S204. In step S204, a zooming operation is executed by moving the zoom lens in response to an operation at the zoom switch 30. If the electronic camera is currently set in the reproduction mode, the operation proceeds to step S205 to execute an electronic zoom operation for a reproduced image currently on display at the display unit 43.

If the electronic camera is currently set in the wireless communication mode, the operation proceeds to step S206 to move the zoom lens in response to an operation at the zoom switch 30. In step S207, the communication state is checked by detecting the reception sensitivity at the antenna 21. In step S208, the reception sensitivity at the antenna 21 having been detected in step S207 is indicated at the display unit 43. The reception sensitivity may be indicated by using, for instance, an icon or the like indicating the specific reception sensitivity level. Once the reception sensitivity is indicated, the current processing ends.

It is to be noted that if the reception sensitivity cannot be raised by adjusting the position of the antenna 21 through the sensitivity adjustment processing explained above, the intensity of the radio signal should be raised.

Variations

Figure 7:
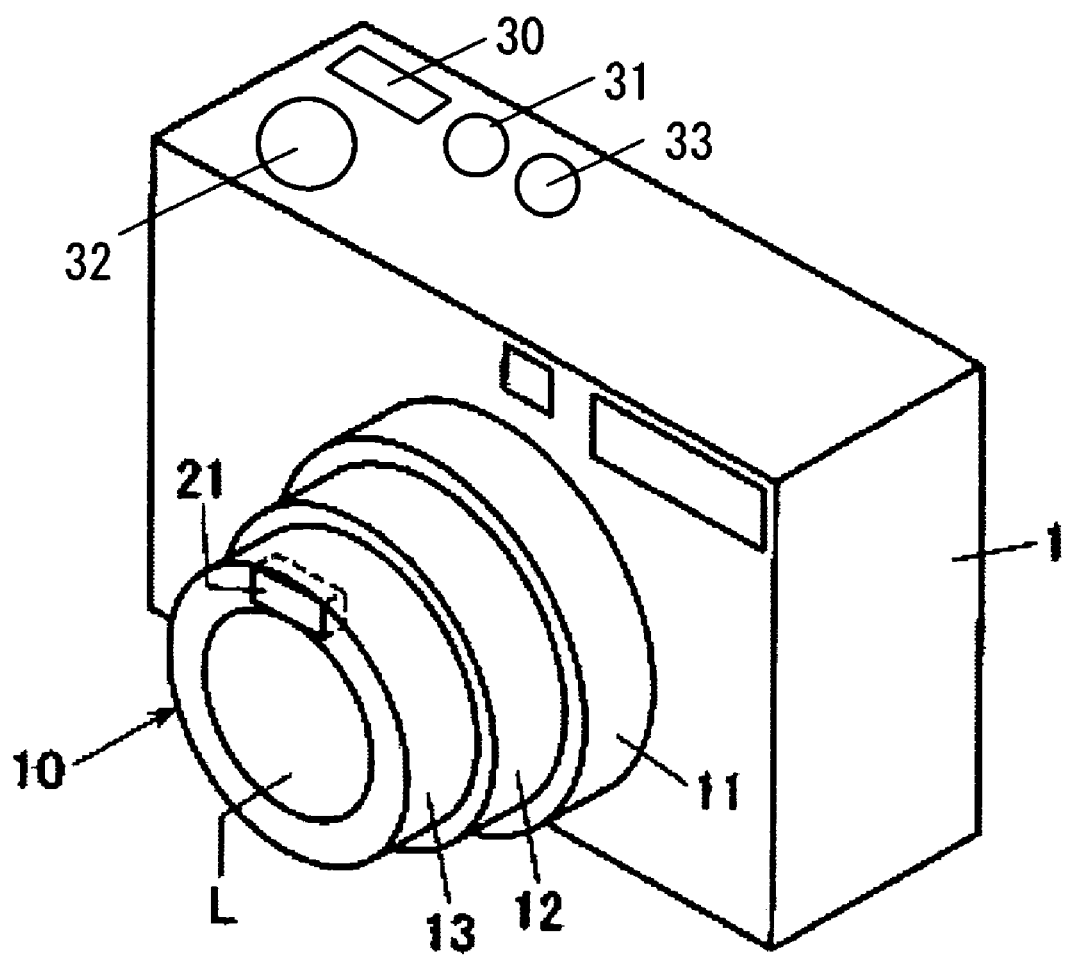
FIG. 7 presents an example in which the antenna is disposed at the front end of the lens barrel.

As an alternative, the antenna 21 may be disposed at the third tubular body 13 located at the front end, as shown in FIG. 7. In this case, the antenna 21 does not revolve around the optical axis but as the lens barrel 10 is driven out, the antenna 21 can be moved further away from the metal cover 1.

An explanation is given above on an example in which the present invention is adopted in a camera in which the lens barrel 10 is housed inside the camera body as shown in FIG. 1 when it assumes the retracted position. However, the present invention is not limited to this example and it may be adopted in a camera in which the lens barrel 10 in the most retracted state still projects out of the camera body. In addition, the antenna 21 may be installed at the lens barrel 10 of a camera that does not execute the zooming operation. However, the lens barrel 10 still advances and retreats along the optical axis between the retracted state in which the lens barrel 10 is housed at the camera body and the photographing-enabled position at which photographing is enabled. This lens barrel operation includes a photographing preparation operation during which the lens barrel 10 advances/retreats prior to the actual photographing operation. It is to be noted that the photographing-enabled position may be assumed in the range between the photographing-allowed position at which the lens barrel 10 has been driven out to the minimum extent and the position at which the lens barrel 10 has been driven out to the maximum extent.

In addition, while the antenna is disposed at the lens barrel in the embodiment described above, it may instead be disposed at a component other than the lens barrel, as long as the component is a non-metal movable (retractable) part that can be driven out of and driven back into the camera body. For instance, the antenna may be disposed at a pop-up type built-in flash unit. The flash unit should be housed inside a non-metal (e.g., resin) casing, and the antenna disposed at its projecting end can be set away from the camera cover as the flash unit pops up. In this case, advantages similar to those described above are achieved, as long as wireless communication is always executed in a pop-up state. Furthermore, the electronic camera may include a liquid crystal monitor that can be turned to face any direction (e.g., a free angle monitor). This type of monitor can be driven out of and driven back into the camera body. The antenna may be disposed at the casing constituted of a non-metal material in which such a monitor is housed. Alternatively, the antenna may be mounted at a non-metal antenna mounting unit that that can be driven out of and driven back into the camera body and is provided as an additional component.

It is to be noted that the positions and the shapes assumed for the zoom switch 30, the mode selector switch 31 and the sensitivity adjustment mode changeover switch 33 are not limited to those shown in FIG. 1 and the like.

In the first embodiment described above, in which the antenna used for wireless communication is disposed at a non-metal movable portion that can be made to driven out of and driven back into the camera body, the antenna can be distanced from the camera body by projecting the movable portion out. As a result, even when the camera cover is constituted of metal, desirable wireless communication performance is assured. By leaving the movable portion in a retracted state when wireless communication is not executed, it is ensured that the movable portion does not become an obstruction.

Second Embodiment

The second embodiment of the present invention is explained.

Figure 8:
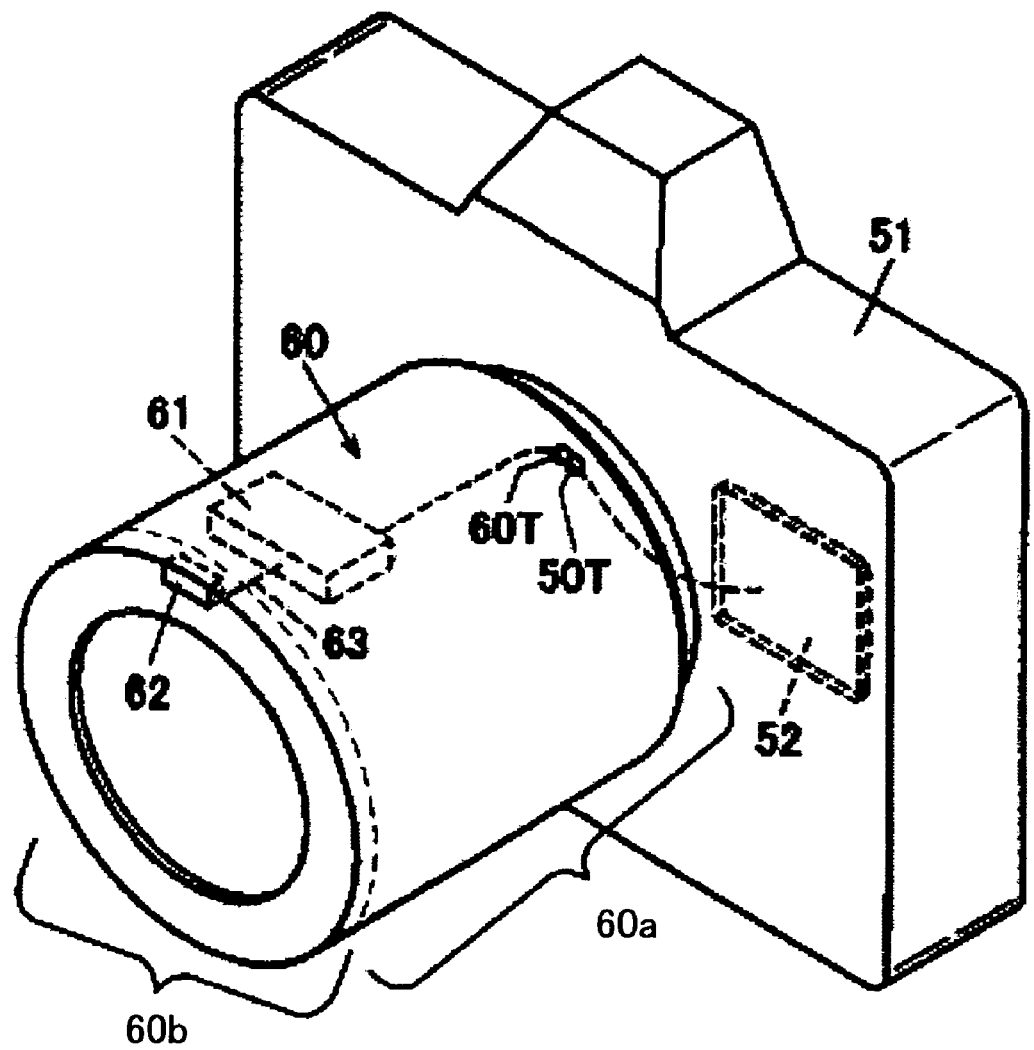
FIG. 8 is a perspective of the electronic camera and the exchangeable lens barrel in a second embodiment.

FIG. 8 shows a single lens reflex type electronic camera having mounted thereat an exchangeable lens barrel 60. Reference numeral 51 indicates a metal cover constituting the outer casing of the camera body and a control unit 52 that controls camera operations is housed inside the cover 51.

The exchangeable lens barrel 60 is constituted with a metal portion 60a mounted at the camera body and a resin portion (non-metal portion) 60b located at the front end of the lens barrel 60 at a position furthest away from the metal cover 51 of the camera body.

The exchangeable lens barrel 60 houses therein a wireless communication board at which a wireless communication circuit 61 is mounted and a wireless communication antenna 62, with the wireless communication board and the wireless communication antenna electrically connected via a wiring member 63. The antenna 62 is disposed at the resin portion 60b located at the lens barrel 60. As the lens barrel 60 is mounted at the camera body, a lens barrel-side contact point 60T and a camera-side contact point 50T come in contact with each other, thereby electrically connecting the wireless communication circuit 61 and the control unit 52. The control unit 52 sends data to be transmitted (e.g., image data) to the wireless communication circuit 61 which then converts the data to a radio signal and transmits the radio signal via the antenna 62. In addition, data transmitted from an external source and received at the antenna 62 can be taken into the camera.

Since the antenna 62 is disposed at the front end of the lens barrel 60, good communication performance is assured, as in the first embodiment, even though the metal cover 51 is used. It is to be noted that the sensitivity of the antenna 62 in the second embodiment may also be adjusted either automatically or manually, as in the first embodiment explained earlier.

The above described embodiments are examples, and various modifications can be made without departing from the scope of the invention.

What is claimed is:

1. A camera system including a camera body and an exchangeable lens barrel, comprising:
   a control unit in the camera body;
   a wireless communication circuit in the exchangeable lens barrel;
   a wireless communication antenna disposed at the exchangeable lens barrel; and
   an electrical contact point that enables data exchange between the wireless communication circuit and the control unit, wherein:
   the wireless communication antenna sends outside data that the wireless communication circuit receives from the control unit via the electric contact point, and
   the wireless communication circuit sends data that the wireless communication antenna receives from outside, to the control unit via the electric contact point.

2. A camera system according to claim 1, wherein:
   the wireless communication antenna is disposed at a resin portion that forms at least a part of the exchangeable lens barrel.

3. A camera system according to claim 1, wherein:
   the exchangeable lens barrel includes a metal member and a non-metal member;
   the wireless communication circuit is disposed at the metal member; and
   the wireless communication antenna is disposed at the non-metal member.

4. A camera system according to claim 3, wherein the non-metal member is located at a position further from the camera body than the metal member.

* * * * *